(12) United States Patent
Drenik

(10) Patent No.: US 11,619,405 B1
(45) Date of Patent: Apr. 4, 2023

(54) AIRFLOW MOISTURE REDUCTION SYSTEM

(71) Applicant: Greg Drenik, Mentor, OH (US)

(72) Inventor: Greg Drenik, Mentor, OH (US)

( * ) Notice: Subject to any disclaimer, the term of this patent is extended or adjusted under 35 U.S.C. 154(b) by 0 days.

(21) Appl. No.: 17/941,402

(22) Filed: Sep. 9, 2022

Related U.S. Application Data

(60) Provisional application No. 63/303,898, filed on Jan. 27, 2022.

(51) Int. Cl.
| F24F 7/06 | (2006.01) |
| F24F 11/74 | (2018.01) |
| F24F 13/02 | (2006.01) |
| F24F 11/80 | (2018.01) |
| F24F 110/20 | (2018.01) |

(52) U.S. Cl.
CPC .............. *F24F 7/065* (2013.01); *F24F 11/74* (2018.01); *F24F 11/80* (2018.01); *F24F 13/0236* (2013.01); *F24F 2110/20* (2018.01)

(58) Field of Classification Search
CPC .. F24F 7/065; F24F 11/74; F24F 11/80; F24F 13/0236; F24F 2110/20
USPC ........................................................ 454/329
See application file for complete search history.

(56) References Cited

U.S. PATENT DOCUMENTS

| 4,515,071 A | * | 5/1985 | Zach ...................... F26B 21/00 34/233 |
| 5,885,329 A | | 3/1999 | Hermann |
| 6,524,182 B2 | * | 2/2003 | Kilburn ..................... F24F 7/00 454/354 |
| 9,950,292 B2 | | 4/2018 | Pedace |
| 10,753,627 B1 | * | 8/2020 | Stevenson ............... F24F 7/065 |
| 10,907,403 B2 | * | 2/2021 | Pemberton ................ E06B 7/02 |
| 2001/0037650 A1 | | 11/2001 | Scheufler |
| 2005/0011962 A1 | | 1/2005 | Weisenberger |
| 2008/0102744 A1 | * | 5/2008 | Moore .................... B01D 53/30 454/249 |
| 2013/0045671 A1 | * | 2/2013 | Apple .................. F24F 11/0001 454/239 |
| 2013/0281002 A1 | * | 10/2013 | Cislo ......................... F24F 7/06 454/258 |

FOREIGN PATENT DOCUMENTS

EP 0816779 A1 1/1998

\* cited by examiner

*Primary Examiner* — Avinash A Savani
*Assistant Examiner* — Dana K Tighe

(57) ABSTRACT

The airflow system includes a wall penetration hole, a high-velocity fan system attached to that hole, and a port manifold which allows multiple fan systems to be connected to one wall penetration. The airflow system is controlled with a timer and a fan speed controller, either wirelessly or with electrical wiring. The airflow system is further self-optimizing with a temperature and humidity controller that allows the airflow system to turn itself on and off to adjust the designated space to reach a target temperature or humidity for the space. The airflow system reduces moisture in a designated space to improve air quality and reduce biological spores and gasses from poorly ventilated spaces.

14 Claims, 7 Drawing Sheets

AIRFLOW MOISTURE REDUCTION SYSTEM

FIELD OF THE INVENTION

The present invention relates generally to an air flow moisture reduction system. More specifically, the present invention is a system of strategically placed high velocity inline fans to increase the evaporation rate of a space by providing targeted air movement.

BACKGROUND OF THE INVENTION

Many structures are designed with poor ventilation systems and do not properly move the air within the structure. When the stagnant air sits within a structure, the chance of individuals being exposed to pollutants increases greatly. This stagnant air can cause mold and mildew that release disease-causing toxins. These disease-causing toxins can be especially harmful to children and elderly people with breathing problems, allergies, or lung diseases. Thus, the biological agents within the indoor air drastically reduce the indoor air quality. Some structures regulate and ventilate many areas of the structure properly, but neglect seldom used areas such as basements, crawl spaces and attics. This causes biological spores and gasses to spread from these poorly ventilated spaces. The potential contaminates are created by the buildup of water vapor and high temperatures within poorly ventilated areas. Many structures have placed dehumidifying systems within these areas to try to mitigate the buildup of water vapor. Unfortunately, the method of only dehumidifying a space does not properly move the air within the space. As recommended by the Environmental Protection Agency (EPA), a space should be ventilated, air should be distributed, excess water and moisture should be eliminated, and relative humidity should be maintained and reduced to reduce biological exposure.

An objective of the present invention is to provide users with an airflow moisture reduction system to help increase ventilation of a desired space. The present invention intends to provide users with a system that increases air distribution while decreasing water content. To accomplish that, a preferred embodiment of the present invention comprises a plurality of fan systems, designed to move air rapidly through a designated space to dehumidify it and reduce the temperature. The system can be optimized using timers and fan speed controllers to ensure that the air can flow through the system to ensure mold and harmful biological agents are eliminated within the designated space.

Further, the system can be self-optimized with a temperature and humidity controller that signals the airflow system to turn on and off to reach a target temperature or humidity. Using the flex ducts to provide targeted, high velocity air movement, the evaporation rate of water molecules can be greatly facilitated, and the evacuation of fungal/bacterial spores and gasses can be enhanced. Thus, the present invention is an airflow moisture reduction system that increases ventilation and air distribution while reducing water content, evacuates organic gasses, and vaporizes and removes water from surfaces of a space by utilizing a series of self-optimizing high velocity inline fans connected to the outdoors via flex ducts.

SUMMARY OF THE INVENTION

The present invention is an air flow system intended to reduce moisture in a designated space. The present invention seeks to provide users with a system that can quickly move air around and through a designated space, such as a room or crawlspace in a structure.

The word "hardwiring" as it appears in this document should be construed to encompass an electrical connection using electric wiring.

The air flow moisture reduction system (hereinafter "airflow system") comprises a duct system. The duct system comprises a wall penetration, a wall penetration sleeve, a protective cover, and at least one fan system. The duct system can further comprise a port manifold to allow more fans to be connected to the wall penetration, a fan speed controller to allow the airflow speed to be controlled, a timer to control when the system goes on and off, and a temperature and humidity controller to allow the system to autonomously adjust itself to accordingly adjust the temperature and humidity of the designated space to hit a target goal that is set by the user.

The wall penetration comprises a block with a hole sized to accommodate a flex duct that is mortared into a wall, window, or other boundary of the designated space. The hole connects the inside of the designated space to an area outside the designated space. In most cases, the area outside of the designated space will be outdoors. The wall penetration is sized to accommodate a predesignated length of flex duct, being between four to six inches in diameter in the ideal embodiment, though other sizes are contemplated depending on the size of the duct the user desires based on the space available. The wall penetration need not go directly through a wall and can be placed through a window or other surface that leads to the outside. If placed in a window, the block is ideally made from a translucent or transparent material, such as plastic, to allow the light to propagate through. Otherwise, the block is made of a material similar to the existing boundary or wall, such as bricks or metal.

The wall penetration is covered by a protective grate. In the ideal embodiment, the protective grate comprises a louvered metal screen that allows air to enter the system while keeping debris out, though other materials and designs that accomplish a similar effect of debris protection are contemplated, such as a wire mesh screen. The protective grate may be affixed to the wall penetration by a fastener, such as such as screws, nuts, bolts, adhesive, gasket clamps, or any fastener which keeps the protective grate in place over the wall penetration. Any disclosure of "fastener" in this document should be construed to include any of the above options.

The wall penetration sleeve comprises a plastic or metal material and is configured to slide into the wall penetration. The wall penetration sleeve rests within the wall penetration and is affixed to the penetration by a fastener such as screws, nuts, bolts, adhesive, gasket clamps, or any other fastener which keeps the wall penetration sleeve stationary within the wall penetration. The wall penetration sleeve should be slightly smaller than the diameter of the wall penetration, such that it slides easily into the penetration while its circumference is still in contact with the inner edges of the wall penetration.

The fan system comprises a fan and a flex duct. The flex duct is a hollow tube having a first end and a second end, and the flex duct is designed to carry air either into or out of the designated space, depending on whether it is part of the intake duct system or export duct system. The flex duct is ideally made of a pliable material to allow it to contour and fit into small spaces and remain out of the way of the user, for example, flexible plastic or similar materials. The fan is placed within the designated space, ideally about one inch from a surface to be dehumidified. The fan is attached inline to the flex duct at the first end of the flex duct. The second end of the flex duct is attached to the wall penetration sleeve by a fastener. In an alternate embodiment, the second end of the flex duct is attached to a port manifold if more than one fan system is desired to be used in the duct system. In the ideal embodiment, the fan is a high-velocity fan that spins at high speed to move air.

Should one or more fan systems be needed to properly service the designed space, a port manifold is used to allow the attachment of multiple fan systems to one wall penetration. The port manifold comprises an entry hole and a plurality of exit holes. The entry hole is connected to a flex duct (hereinafter the "master flex duct") leading to an associated wall penetration, and each of the plurality of exit holes is connected to a fan system. Through this use of the port manifold, multiple fan systems may be connected to the same wall penetration to increase the airflow through the designated space. Additionally, the port manifold may be used with a variable connector affixed to the entry or exit holes—for example, a variable connector allows the duct size of the entering or exiting flex duct to be reduced or widened to improve or reduce the airflow velocity, respectively. In the ideal embodiment, the port manifold comprises a y-splitter that allows one master flex duct to split into two paths. Other embodiments may make use of other port manifolds having more connections to allow for greater numbers of fan systems to be connected.

The timer comprises an electronic or mechanical timing system that is configured to control the state of the system. When the timer is running and has time remaining, the system is on, meaning the fans are turned on and moving air through the space. When the timers are off, the system is off, meaning the fans are off and no air is being moved through the space. In the ideal embodiment, the timer is connected to the system via hardwiring, though other connectors, such as wireless communication with wireless transmitters affixed to the system and the timer, are contemplated.

Further, a fan speed controller is connected to the one or more duct systems. One fan speed controller may be connected to both the intake and export systems to service the entire airflow system, or the intake fans and export fans may be controlled separately by individual fan speed controllers. In the ideal embodiment, the one or more fan speed controllers are connected to the system via hardwiring, though other connectors, such as wireless communication with wireless transmitters affixed to the system and the fan speed controller, are contemplated.

The airflow system further comprises a temperature and humidity controller to allow for autonomous adjustment of the system to hit a target temperature and humidity goal within the designated space. The temperature and humidity controller is placed inline with the fan in the fan system. For example, the user may desire the designated space to have 40% humidity. The user can set the target goal on the temperature and humidity controller to be 40% humidity, and the airflow system will only run to adjust the humidity accordingly to hit the 40% target, turning off once the designated space reaches 40% humidity.

In an optional embodiment, a dehumidifier may be used in conjunction with the system. The dehumidifier may be placed within the same space as the duct system or other affixed or fastened to the system. The dehumidifier may be hardwired or battery-powered. The dehumidifier will assist in removing moisture and water from the air in the designated space to speed the rate at which the designated space dries out and aid in further evaporation.

DETAILED DESCRIPTIONS OF THE INVENTION

All illustrations of the drawings are for the purpose of describing selected versions of the present invention and are not intended to limit the scope of the present invention.

Figure 1:
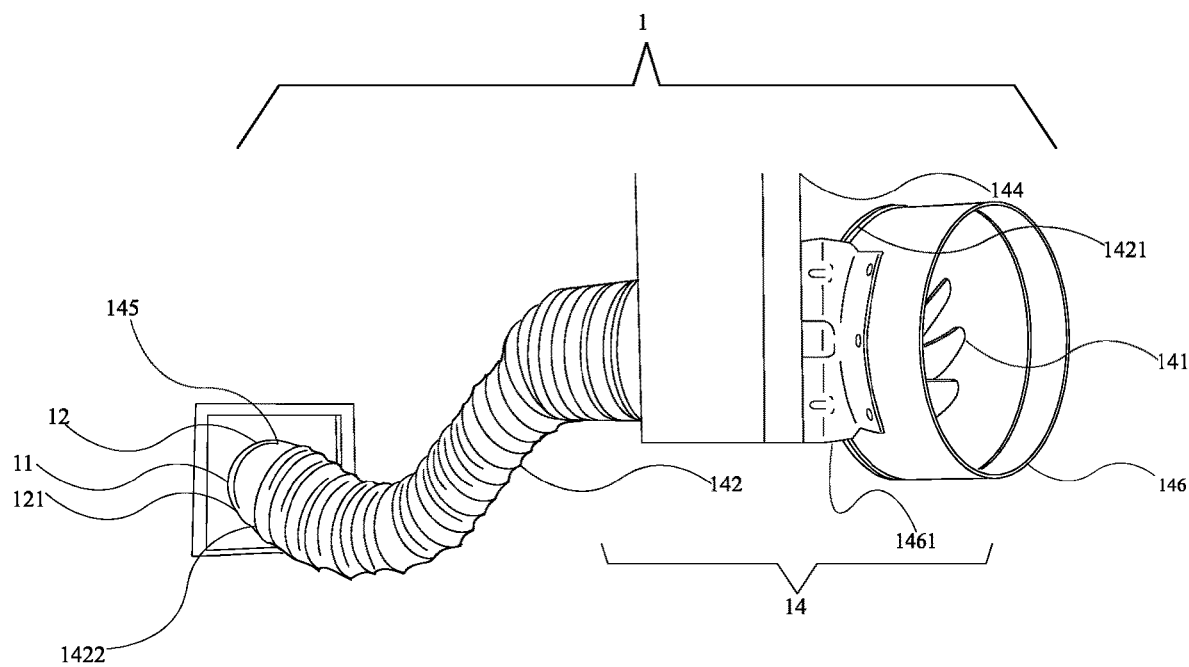
FIG. 1 shows the duct system affixed to a ceiling joist; the flex duct being attached to the wall penetration leading outside.

Referring now to the figures, FIG. 1 shows an exemplary embodiment of the interior side of a duct system 1 that comprises a wall penetration 11, a wall penetration sleeve 12, a first fastener 121, and a fan system 14. The fan system 14 comprises a fan 141, a flex duct 142, and a second fastener 143.

The wall penetration 11 is a block with a hole in the center of the block. In the ideal embodiment, the wall penetration 11 is a translucent block that is mortared into an existing wall or window. The hole in the wall penetration 11 connects the inside of the designated space to an area outside the designated space. In most cases, the area outside of the designated space will be outdoors. The wall penetration 11 is sized to accommodate a predesignated length of flex duct 142, being between four to six inches in diameter in the ideal embodiment, though other sizes are contemplated depending on the size of the duct the user desires based on the space available. The wall penetration 11 need not go directly through a wall and can be placed through a window or other surface that leads to the outside.

FIG. 1 shows an exemplary embodiment of the wall penetration 11 being placed through a window to lead to the outdoors. The inside of the wall penetration 11 contains a wall penetration sleeve 12. The wall penetration sleeve 12 is designed to fit perimetrically within the wall penetration 11 and is comprised from a material such as plastic or metal. The wall penetration sleeve 12 rests within the wall penetration 11 and is affixed to the wall penetration 11 by a first fastener 121, being an adhesive in this figure, but other fasteners such as screws, nuts, bolts, adhesive, gasket clamps, or any other fastener which keeps the wall penetration sleeve 12 stationary within the wall penetration 11. In this exemplary embodiment, the wall penetration 11 is a translucent block that is mortared into an existing window.

FIG. 1 further shows a fan system 14 being connected to the wall penetration 11. In this embodiment, the fan system 14 is affixed from a ceiling joist 144. The fan system 14 comprises a fan 141, a flex duct 142 having a first end 1421 and a second end 1422, and a second fastener 143. The fan 141 is a high-velocity fan. In the ideal embodiments, the fan 141 should be configured such that the system has an airflow speed of between 400-800 Cubic Feet per Minute (CFM). However, other speeds are contemplated, such as ranges between 300-1100 CFM, or other speeds as the needs of the user require. The fan 141 can be arranged to either pull air into the designated space or expel air from the designated space. The fan 141 is set inline with the first end 1421 of the flex duct 142, such that when the fan 141 is on, air will be either expelled through the flex duct 142, or pulled through the flex duct 142 and out from or into the wall penetration 11, respectively. The fan 141 is affixed inline with the first end 1421 of the flex duct 142 through a second fastener 143, the second fastener 143 being comprised of screws, nuts, bolts, adhesive, gasket clamps, or any other fastener which keeps the fan 141 affixed to the flex duct 142. The second end 1422 of the flex duct 142 is affixed to the wall penetration sleeve 12 by a third fastener 145, comprising adhesive in this exemplary embodiment. A fan cover 146 is affixed to the fan 141 such that the fan cover 146 encompasses the fan 141 perimetrically. The fan cover 146 servers to protect the fan 141 and to allow the fan 141 to be mounted with a bracket 1461 or other similar mounting device to the ceiling joist 144 or another similar structure.

Figure 2:
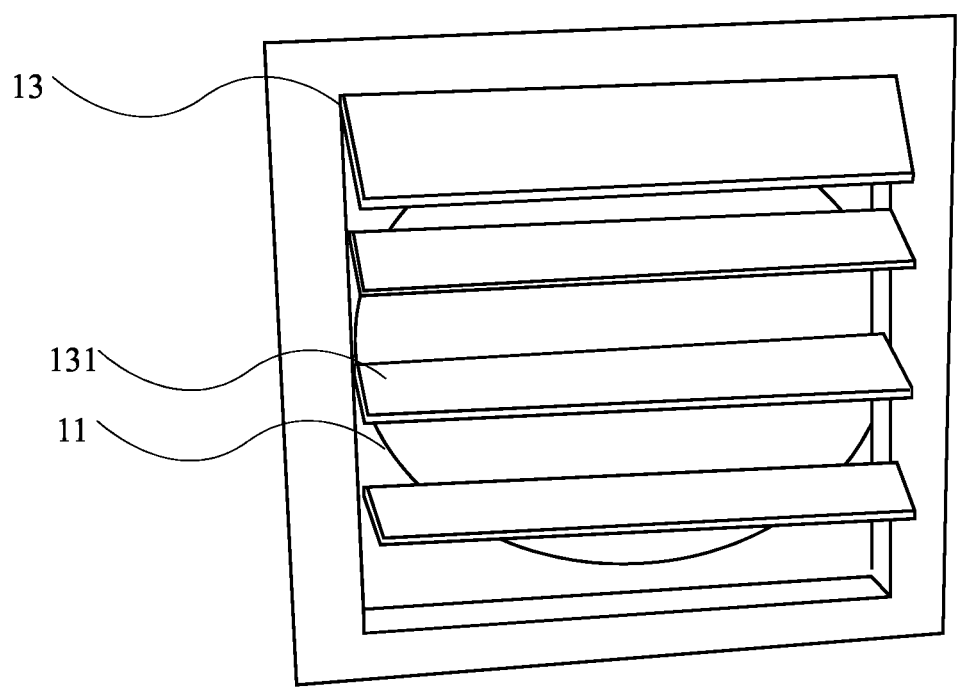
FIG. 2 shows an example of the protective cover.

FIG. 2 shows an exemplary embodiment the exterior of the wall penetration 11 from FIG. 1. The protective cover 13 shown in this example embodiment comprises a louvered metal screen. The louvers 131 may fold down or up to cover more or less of the wall penetration 11 depending on the preference of the user. Other designs of the protective cover 13 that serve to keep out debris are contemplated, such as the use of a mesh screen.

Figure 3:
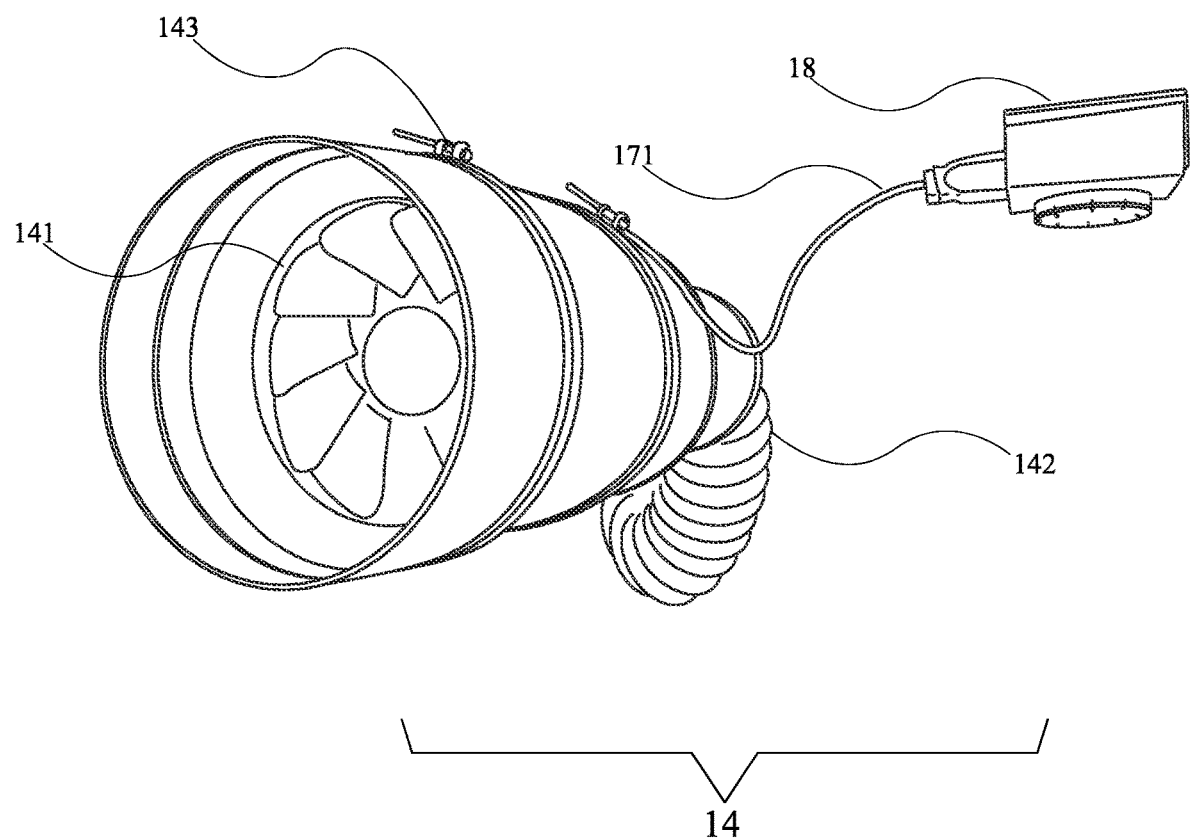
FIG. 3 shows the fan system being electrically wired to a timer to control the fan system.

FIG. 3 show an example of the fan system 14 connected to a timer 18 via hardwiring 171. In this exemplary embodiment, the second fastener 143 that is holding the fan 141 inline with the flex duct 142 comprises a gasket clamp. The timer 18 is configured to control when the system turns on and off by controlling the power to the fan system 14, or may alternatively be wired to provide power to the airflow system as a whole. Other connectors from the fan system 14 to the timer 18 are contemplated, such as the use of a wireless connection with the timer sending a signal that is received by a receiver on the airflow system, achieved by placing a first wireless transmitter on the fan system and a second wireless transmitter on the timer 18.

Figure 4:
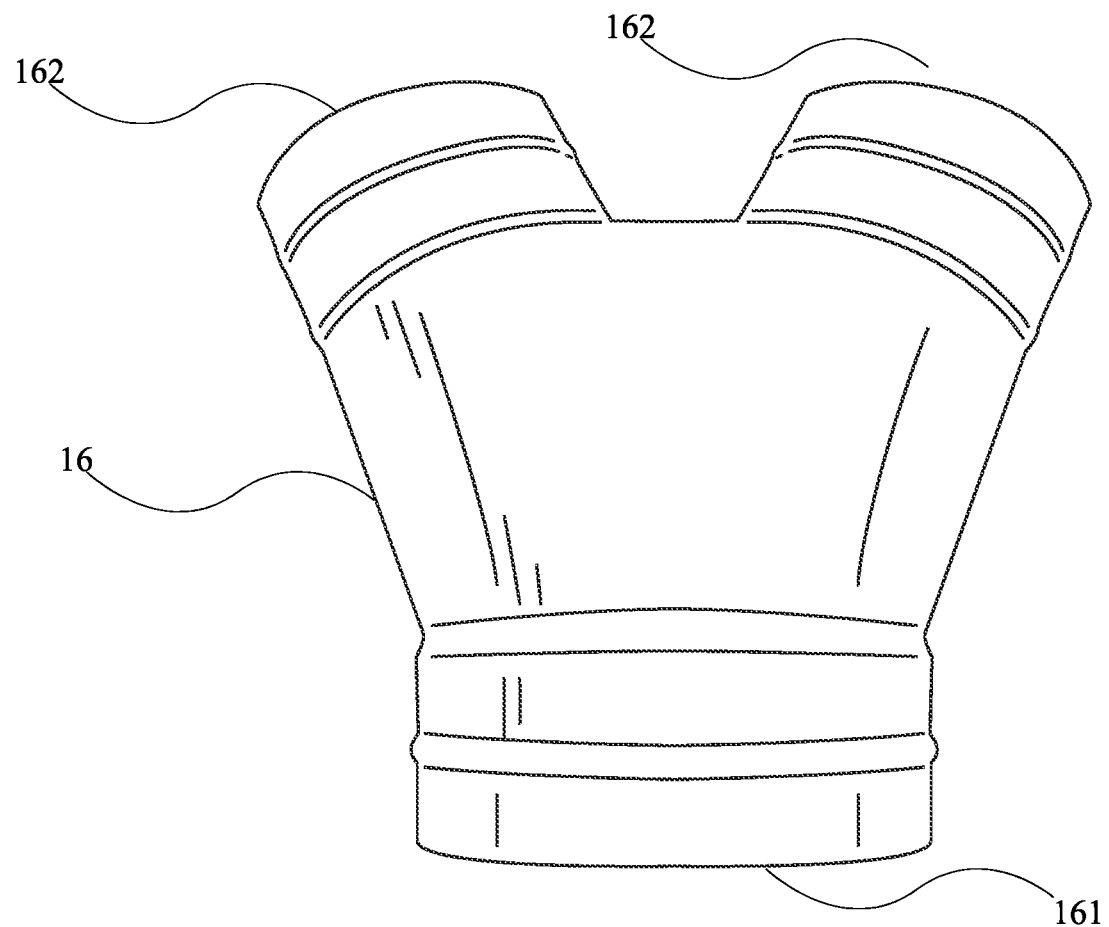
FIG. 4 shows an exemplary embodiment of the port manifold having one entry hole and two exit holes.

FIG. 4 shows an example of the port manifold 16 in a disconnected state. This exemplary port manifold 16 has one entry hole 161 and two exit holes 162. When in a connected state, the entry hole 161 is connected to a flex duct 142 that in turn is connected to a wall penetration 11. Each of the exit holes 162 is connected to a separate fan system 14. Though the exemplary embodiment shows a y-split design having one entry hole 161 and two exit holes 162, other embodiments are contemplated that may have one or more entry holes 161 and one or more exit holes 162 to allow for a variety of connection configurations, and to allow the use of a plurality of fan systems 14.

Figure 5:
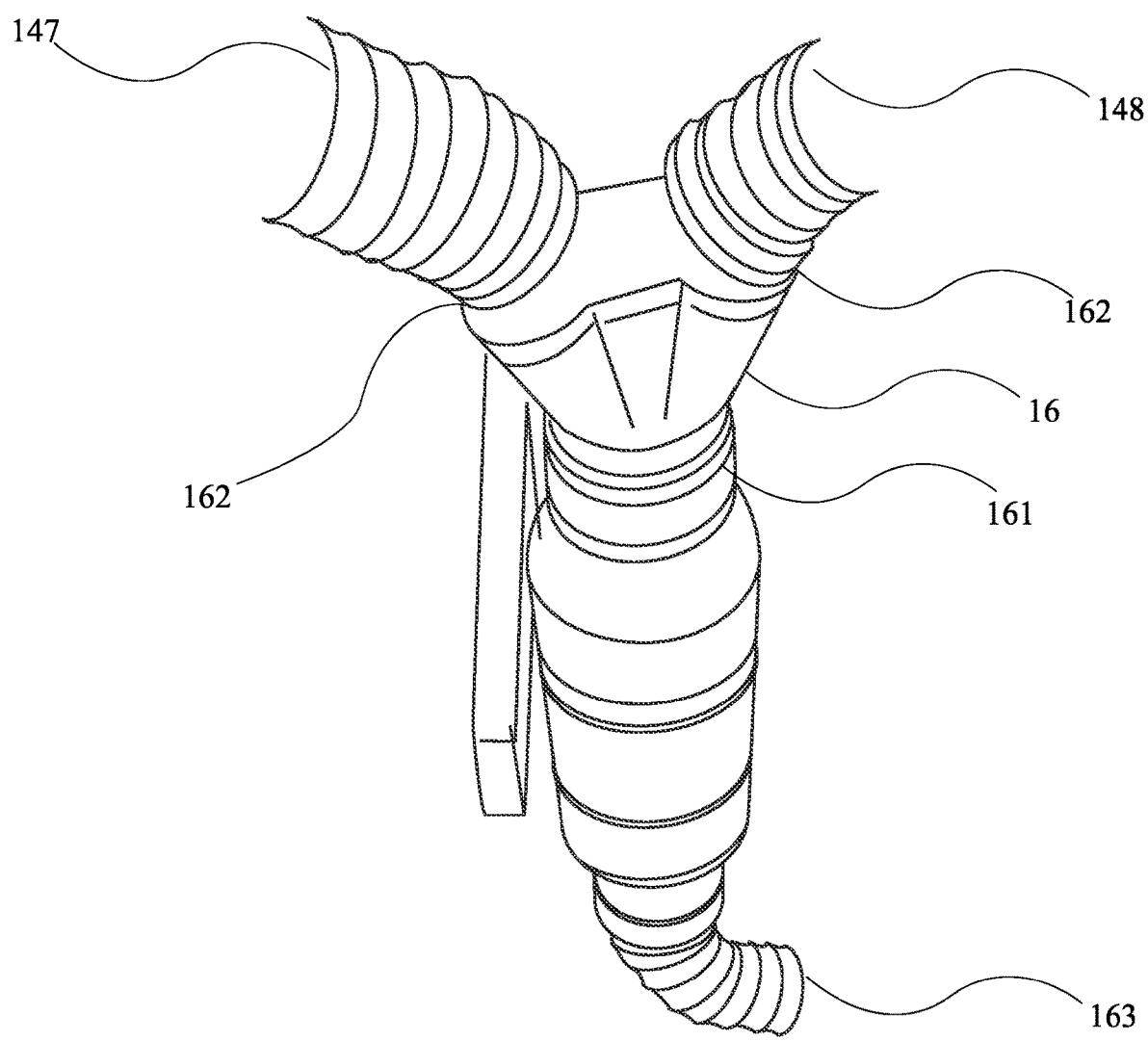
FIG. 5 shows an example of the port manifold in use with the duct system.

FIG. 5 shows an example of the port manifold 16 in a connected state. The exemplary port manifold 16 shown is connected via the entry hole 161 to a master flex duct 163, the master flex duct 163 leading to an outside space. The two exit holes 162 attach to a second flex duct 147 and third flex duct 148 respectively, the second flex duct 147 and third flex duct 148 each being part of a fan system 14 that is configured to either expel or intake air. In alternate embodiments, the two exit holes 162 or entry hole 161 may be configured to attach to a variable connector, allowing the size of the attached flex duct to be either widened or narrowed to reduce or enhance the airflow velocity, respectively.

Figure 6:
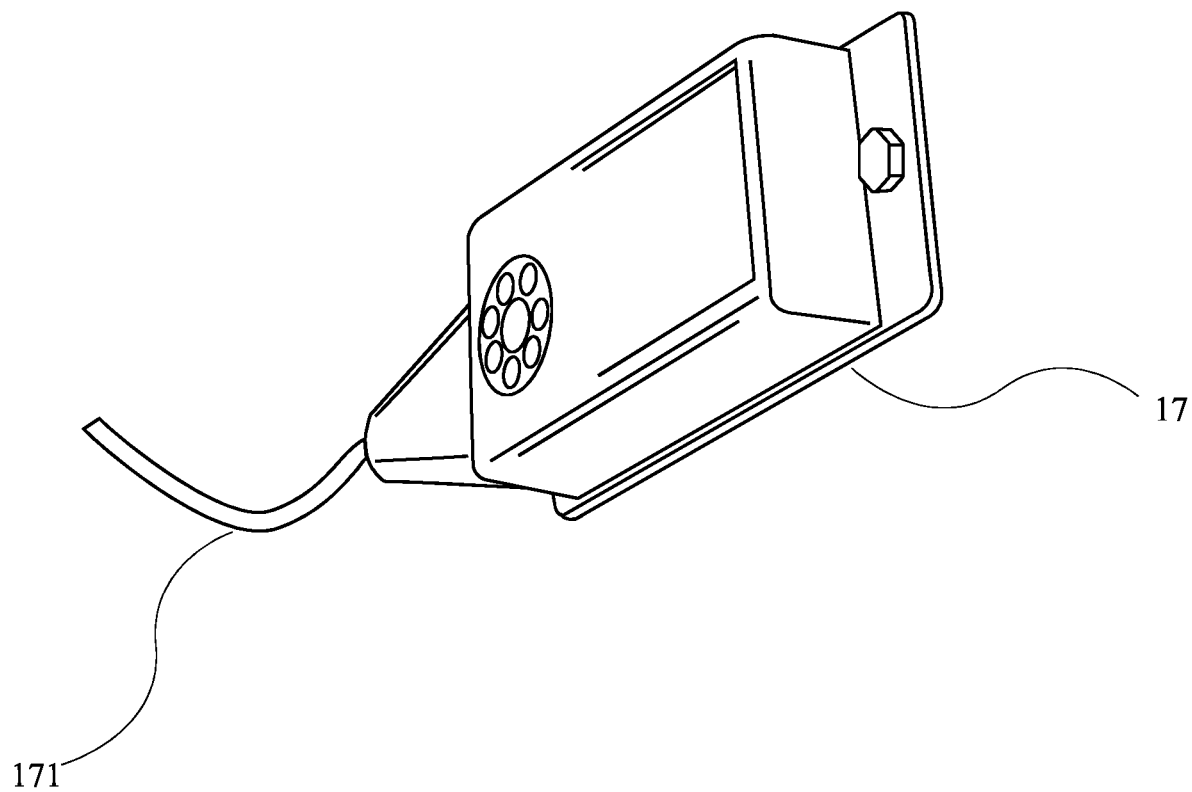
FIG. 6 shows an example of the fan speed controller being electrically wired to the system.

FIG. 6 shows an exemplary embodiment of the fan speed controller 17. The fan speed controller 17 in the exemplary embodiment is connected via hardwiring 171 into the system, though other connectors that allow the fan speed controller 17 to communicate with the airflow system are contemplated by alternate embodiments. This includes a wireless connection, achieved by placing a first wireless transmitter on the fan system and a second wireless transmitter on the fan speed controller 17.

Figure 7:
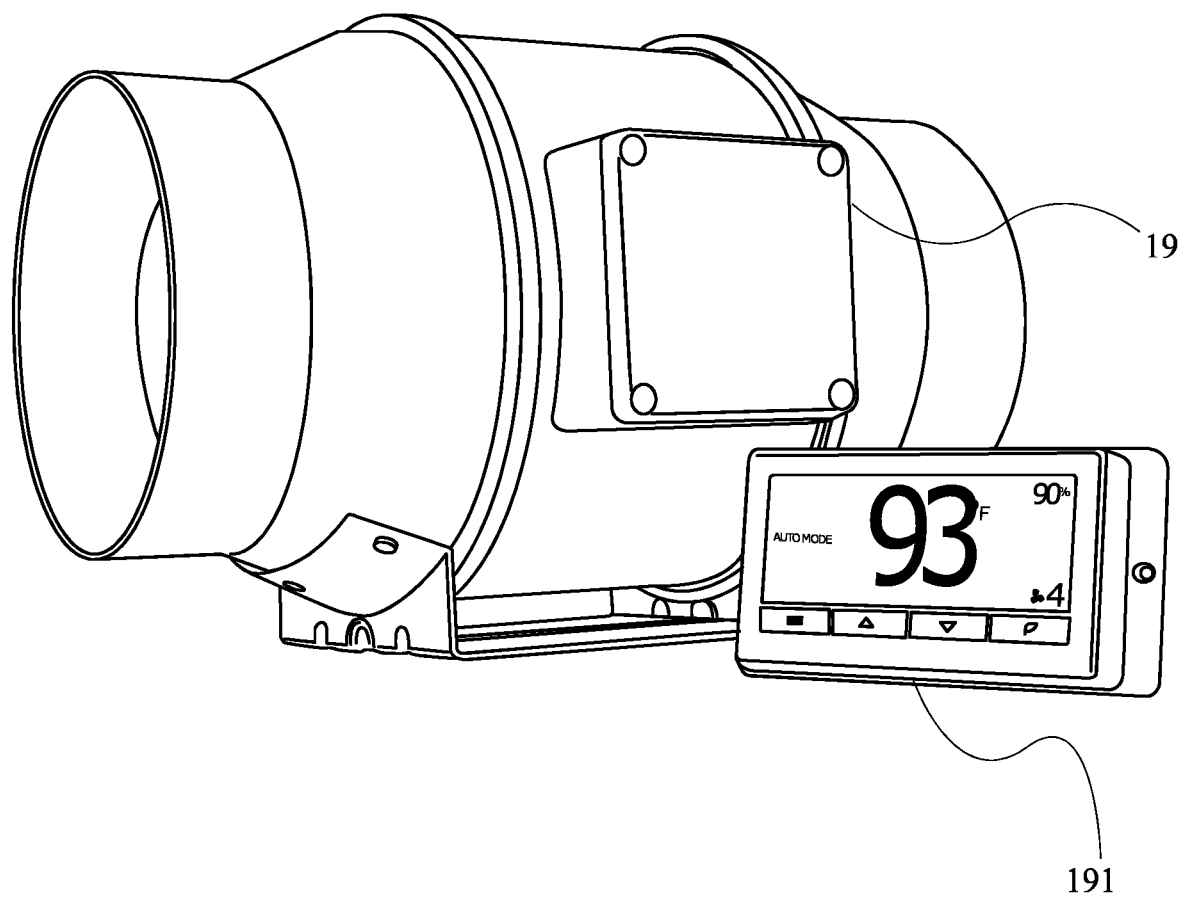
FIG. 7 shows an exemplary embodiment of the temperature and humidity controller.

FIG. 7 shows an example of the temperature and humidity controller 19 independent from the airflow system. The temperature and humidity controller 19 is designed to be affixed inline with the fan 141 and connected to the fan via hardwiring or a wireless connection. The temperature and humidity controller records the current temperature and humidity of the space and has a display 191 that allows the user to select a desired temperature or humidity. Once selected, the temperature and humidity controller 19 will signal the fan system 14 to turn on and off to reach the target temperature or humidity in the space.

In an optional embodiment, a dehumidifier may be used in conjunction with the system. The dehumidifier may be placed within the same space as the duct system 1, or it may be fastened or otherwise affixed to another part of the system, such as being fastened inline with the fan 141 or affixed to the exterior of the flex duct 142. The dehumidifier serves as an additional way to reduce the humidity of the designated space and further increase the effectiveness of the system. The dehumidifier may be hard-wired into the system, or may operate on battery power.

Although the invention has been explained in relation to its preferred embodiment, it is to be understood that many other possible modifications and variations can be made without departing from the spirit and scope of the invention.

What is claimed is:

1. An airflow system comprising:
a wall penetration;
a wall penetration sleeve comprising an interior side and an exterior side;
the wall penetration sleeve being positioned through the wall penetration;
a fan system comprising a flex duct, a fan cover, and a fan;
the fan cover being affixed to the fan to encompass the fan perimetrically;
the flex duct comprising a first duct end and a second duct end;
the fan being affixed inline to the flex duct at the first duct end of the flex duct with a first fastener;
a protective cover affixed to the exterior side of the wall penetration sleeve with a fastener;
a fan speed controller electrically wired to the fan of the fan system;
a temperature and humidity controller being affixed inline with the fan with a fastener;
the temperature and humidity controller being electrically wired to the fan; and
the second duct end of the flex duct being affixed to the interior side of the wall penetration sleeve with a second fastener.

2. The airflow system of claim 1, further comprising a timer electrically wired to the fan of the fan system.

3. The airflow system of claim 2, further comprising:
a first wireless transmitter integrated into the timer;
a second wireless transmitter electrically wired to the fan of the fan system; and
the first wireless transmitter being in communication with the second wireless transmitter.

4. The airflow system of claim 1, further comprising:
a first wireless transmitter integrated into the fan speed controller;

a second wireless transmitter electrically wired to the fan of the fan system; and the first wireless transmitter being in wireless communication with the second wireless transmitter.

5. The airflow system of claim 1, further comprising:
a bracket having a first bracket end and a second bracket end; and
the first bracket end of the bracket being fastened to the fan cover.

6. The airflow system of claim 1, further comprising a plurality of fan systems, a port manifold and a master flex duct;
the master flex duct having a first master end and a second master end;
the port manifold comprising an entry hole and a plurality of exit holes;
the first master end of the master flex duct being affixed to the entry hole of the port manifold with a fastener;
the second master end of the master flex duct being attached to the interior side of the wall penetration sleeve with a fastener; and
each of the plurality of exit holes of the port manifold being affixed to the second duct end of the flex duct of one fan system of the plurality of fan systems with a fastener.

7. An airflow system comprising:
a wall penetration;
a wall penetration sleeve comprising an interior side and an exterior side;
the wall penetration sleeve being positioned through the wall penetration;
a fan cover;
a bracket having a first bracket end and a second bracket end;
the first bracket end of the bracket being fastened to the fan cover;
a master flex duct having a first master end and a second master end;
a port manifold having an entry hole and a plurality of exit holes;
a fan system comprising a first flex duct and a fan;
the fan cover being affixed to the fan to encompass the fan perimetrically;
a timer electrically wired to the fan;
a fan speed controller electrically wired to the fan;
the first flex duct comprising a first duct end and a second duct end;
the fan being affixed inline to the first flex duct at the first duct end of the first flex duct with a first fastener;
a protective cover affixed to the exterior side of the wall penetration sleeve with a second fastener;
the first master end of the master flex duct being affixed to the entry hole of the port manifold with a third fastener;
the second master end of the master flex duct being attached to the interior side of the wall penetration sleeve with a fourth fastener; and
one of the plurality of exit holes of the port manifold being affixed to the second duct end of the first flex duct with a fifth fastener.

8. The airflow system of claim 7, further comprising:
a first wireless transmitter integrated into the timer;
a second wireless transmitter electrically wired to the fan of the fan system; and
the first wireless transmitter being in wireless communication with the second wireless transmitter.

9. The airflow system of claim 7, further comprising:
a first wireless transmitter integrated into the fan speed controller;
a second wireless transmitter electrically wired to the fan of the fan system; and
the first wireless transmitter being in wireless communication with the second wireless transmitter.

10. The airflow system of claim 9, further comprising:
a temperature and humidity controller being affixed inline with the fan system with a fastener; and
the temperature and humidity controller being electrically wired to the fan.

11. The airflow system of claim 9 further comprising:
a plurality of fan systems; and
each of the plurality of exit holes of the port manifold being affixed to the second duct end of the flex duct of one fan system of the plurality of fan systems with a fastener.

12. An airflow system comprising:
a wall penetration;
a wall penetration sleeve comprising an interior side and an exterior side;
the wall penetration sleeve being positioned through the wall penetration;
a fan cover;
a bracket having a first bracket end and a second bracket end;
the first bracket end of the bracket being fastened to the fan cover;
a master flex duct having a first master end and a second master end;
a port manifold having an entry hole and a plurality of exit holes;
a fan system comprising a first flex duct and a fan;
the fan cover being affixed to the fan of the fan system to encompass the fan of the fan system perimetrically;
the fan having a first wireless transmitter electrically wired to the fan;
a timer with an integrated second wireless transmitter;
a fan speed controller with an integrated third wireless transmitter;
the first wireless transmitter being in wireless communication with the second wireless transmitter;
the third wireless transmitter being in wireless communication with the first wireless transmitter;
a temperature and humidity controller being affixed inline with the fan of the fan system with a first fastener;
the temperature and humidity controller being electrically wired to the fan of the fan system;
the first flex duct comprising a first duct end and a second duct end;
the fan being affixed inline to the first flex duct at the first duct end of the first flex duct with a second fastener;
a protective cover affixed to the exterior side of the wall penetration sleeve with a third fastener;
the first master end of the master flex duct being affixed to the entry hole of the port manifold with a fourth fastener;
the second duct end of the master flex duct being attached to the interior side of the wall penetration sleeve with a fifth fastener; and
one of the plurality of exit holes of the port manifold being affixed to the second duct end of the first flex duct with a sixth fastener.

13. The airflow system of claim 12, wherein:
the fan speed controller is electrically wired to the fan of the fan system; and
the timer is electrically wired to the fan of the fan system.

14. The airflow system of claim 13 further comprising:
a plurality of fan systems; and
each of the plurality of exit holes of the port manifold being affixed to the second duct end of the first flex duct of one fan system of the plurality of fan systems with a fastener.

\* \* \* \* \*